Apr. 24, 1923.  
P. V. HOLLENBECK  
MECHANISM FOR MEASURING CUBIC CONTENTS OF BODIES  
Original Filed June 4, 1920  2 Sheets-Sheet 1

1,453,112

INVENTOR  
P. V. Hollenbeck  
BY  
Rogers, Kennedy & Campbell  
ATTORNEYS.

Apr. 24, 1923.

P. V. HOLLENBECK 1,453,112

MECHANISM FOR MEASURING CUBIC CONTENTS OF BODIES

Original Filed June 4, 1920    2 Sheets-Sheet 2

INVENTOR
P. V. Hollenbeck
BY
Rogers, Kennedy & Campbell
ATTORNEYS.

Patented Apr. 24, 1923.

1,453,112

UNITED STATES PATENT OFFICE.

PAUL V. HOLLENBECK, OF NEW YORK, N. Y., ASSIGNOR TO INTERNATIONAL PAPER COMPANY, A CORPORATION OF NEW YORK.

MECHANISM FOR MEASURING CUBIC CONTENTS OF BODIES.

Application filed June 4, 1920, Serial No. 386,611. Renewed October 26, 1922. Serial No. 597,137.

*To all whom it may concern:*

Be it known that I, PAUL V. HOLLENBECK, a citizen of the United States, residing at New York, in the county of New York and State of New York, have invented certain new and useful Improvements in Mechanism for Measuring Cubic Contents of Bodies, of which the following is a specification, reference being had therein to the accompanying drawing.

The object of this invention is to produce a mechanism which will measure the volume or solid contents of bodies, either round, square, hexagonal or of like shapes in cross section and of a fixed or predetermined length, more particularly an apparatus which will measure the solid contents of logs or chunks of wood used in the manufacture of paper pulp.

Logwood is usually purchased and sold by cord-measure, and consequently a very great variation in results is obtained, due mainly to the method of piling the logs and their variations in diameter and size, which conditions either increase or decrease the value of the spaces or interstices between the logs. My improved mechanism measures and records the volume or solid contents of the individual logs or bodies and therefore eliminates the factor of the interstices, so that an accurate measure and determination of the actual volume is secured.

A further advantage secured by my improved mechanism resides in the fact that a great saving of labor is effected, as it will not be necessary to pile the logs in a frame or measure as is now generally practiced, and remove the same and keep tally of the number of frames filled. This labor is dispensed with by the use of my mechanism, as it may be installed in the line of progression where the operator usually handles the logs.

To accomplish these results and advantages my improved mechanism embodies a movable feeler member which is disposed in the path of the logs or bodies to be measured, which latter are advanced against the feeler member by suitable means such as a conveyor, and will act to displace the member to positions determined by the diameters of the bodies, the said feeler member being operatively connected with suitable measuring or recording mechanism by connecting means of such form that the measuring mechanism will be operated by the displaced movements of the feeler member to measure the solid contents of the bodies for a given length of the same.

My improved mechanism also embodies selective means operable to vary the operation of the measuring mechanism to adapt the same for measuring logs or bodies of a different length.

The invention consists also in the details and construction or combination of parts hereinafter described and claimed.

Figure 2:
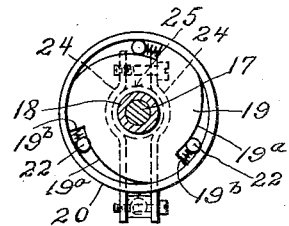
Fig. 2 is a sectional elevation of a detail of the same on the line 2—2 of Fig. 3.

Referring to the drawings:

The operative parts of the mechanism are mounted in and sustained by a suitable framework comprising two uprights 1 and 2 rising from side walls 3 of a trough or runway having a bottom 4 connecting said side walls. The logs or bodies whose volume or solid contents are to be measured, are advanced along the trough by any suitable means, such for instance as a conveyor mechanism 5 shown in Fig. 1.

Dependent in a normally vertical position in the trough in the path of the passing bodies is a movable feeler member 6 in the form of an arm swingingly supported at its upper end by a horizontal shaft 7 to which the arm is fixed by means of a hub 6$^a$ on the end of the arm surrounding and fixed to the shaft. This shaft is mounted at its ends to rock in suitable bearings on the frame uprights, the arrangement being such that the logs advanced by the conveyor will successively displace the arm to angular positions determined by the diameters of the logs. As the forward end of a log engages the arm, the latter will be swung to the left as shown by dotted lines in Fig. 1 until its lower end rests upon the top of the log, whereupon the log will advance beneath the arm, which will be sustained in its displaced position until the rear end of the log passes by and disengages the arm, whereupon the latter will swing back by gravity to its former vertical position as shown by the full lines in Fig. 1, ready to be engaged by the forward end of the next log advanced by the conveyor, it being understood that the logs will be spaced apart on the conveyor sufficiently to enable the arm to thus fall back between them.

As a means for limiting the return movement of the feeler arm, a horizontal bar 9 is provided which is sustained at its ends by the two uprights and extends in rear of the arm at a point about midway of the length of the same, in such a position that as the arm returns to its normal vertical position, it will engage the bar and be thus limited in its motion thereby.

Figure 1:
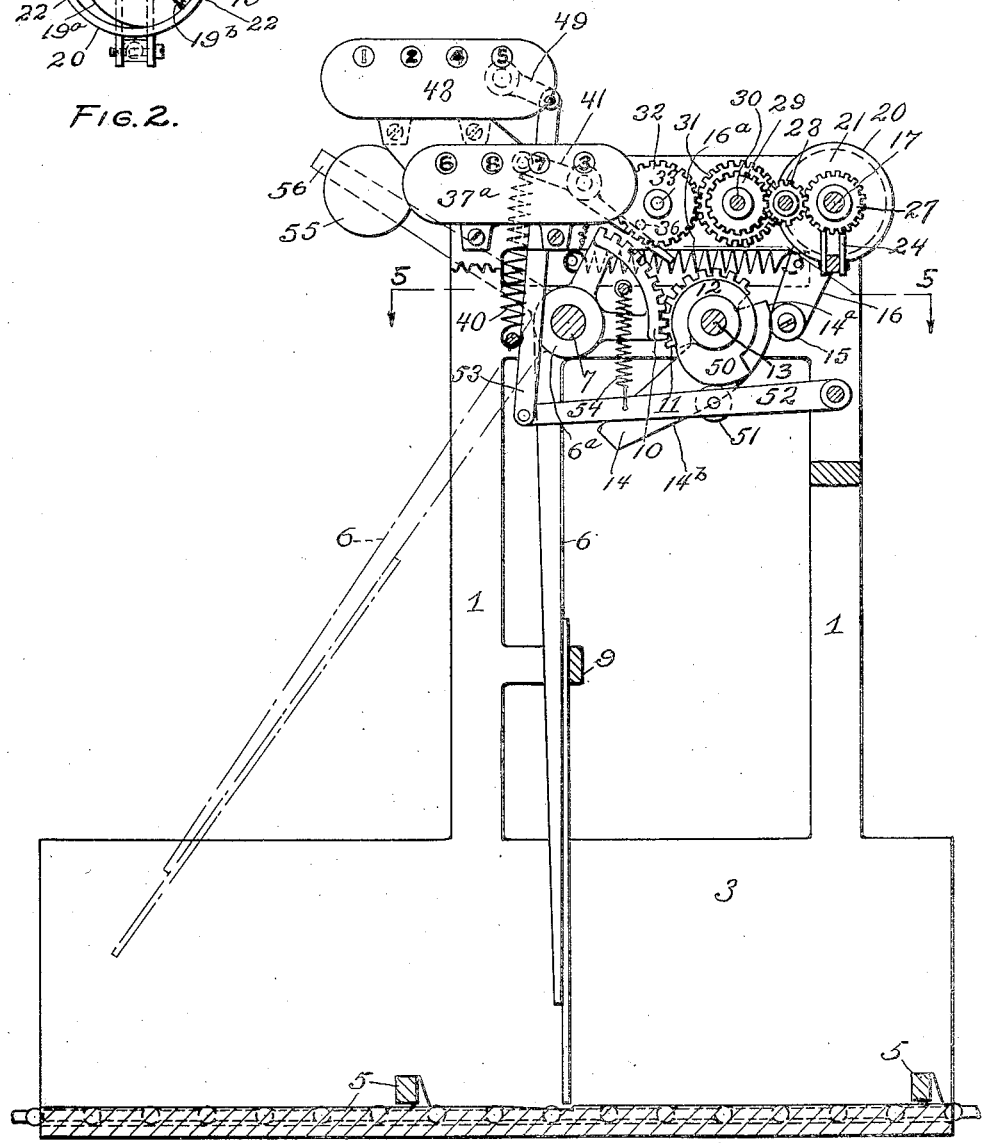
Fig. 1 is a vertical sectional elevation of my improved mechanism on the line 1—1 of Fig. 3.

The shaft 7 has fixed to it at the side of the hub 6ª of the feeler arm a segment gear 10 which meshes with a segment gear 11 on a hub 12 surrounding and fixed to a horizontal shaft 13 mounted in suitable bearings on the two frame uprights. At the rear side of the gear 11, the shaft 13 has fixed to it a cam member in the form of an edge cam 14, the cam surface of which, starting at a point 14ª a given distance from the axial center of the shaft, follows the arc described from said center for a short distance, and then continues in a curve 14ᵇ which rapidly increases in distance from the center of the shaft as shown in Fig. 1. The active edge of the cam engages a roller 15 on the lower end of a vibrating arm 16, and a spring 16ª attached to the arm and frame upright holds the arm yieldingly with the roller engaged with the cam. The upper end of the arm is clutched to a horizontal rotary shaft 17, see Fig. 4, mounted in suitable bearings on the frame uprights above the shaft 13, the clutch connection between the arm and shaft being such that the successive swinging motions of the arm, in the present instance to the right in Fig. 1, imparted by the periodic movements of the cam, will turn the shaft 17 intermittently on its axis, the successive movements imparted by the cam to the arm being thus accumulative in one direction only in the rotation of the shaft.

Any suitable form of clutch or ratchet mechanism may be employed for this purpose, but I prefer to adopt the form of mechanism shown in Fig. 1 and in detail in Fig. 2 where it will be seen that the upper end of the arm 16 is fixed to a sleeve 18 which loosely surrounds the shaft 17 near its rear end. The forward end of the sleeve carries a cam disc 19 provided in its edge with a number of cam surfaces 19ª, which surfaces extend from the periphery of the disc towards the axis of the same and terminate in shoulders 19ᵇ. The cam disc is surrounded by an overhanging flange or rim 20 on the periphery of a circular plate 21 which is fixed to the shaft 17, and rollers 22 are arranged in between the cam surface and the rim which are engaged by spiral springs bearing against the shoulders and acting to urge the rollers towards the contracted ends of the spaces between the cam surfaces and the rim.

As a result of the construction described, when the arm 16 is shifted in one direction, in the present instance to the right Fig. 1, by the high part of the cam 14, the cam disc 19 will be turned, and wedging the rollers between the cam surfaces and rim, the latter will be turned and will impart a corresponding motion to the shaft; and when the arm 16 on its return movement is shifted in the opposite direction by the spring 16ª, when the low part of the cam engages the arm, the rollers 22 will be released and the cam disc will be permitted to move within the rim relatively thereto without imparting motion to the shaft. In order that in the idle return movement of the arm the shaft 17 will be held against accidental movement with it, I propose to apply frictional or braking resistance to the shaft. In the present instance this is effected by means of two brake bands 24 Figs. 2 and 4 which extend on opposite sides of a hub or collar 25 fixed to the shaft 17 near its forward end, these bands being curved between their ends so as to embrace the curved surface of the collar. The bands are sustained at one end by the frame upright 1 and are adjustably connected together at their opposite ends by an adjusting screw, see Figs. 2 and 4, by means of which the frictional or braking pressure on the shaft may be adjustably controlled.

Near its forward end, between the hub 25 and the frame upright 1, the shaft 17 has fixed to it a driving gear 27 which meshes with an idler gear 28, which in turn meshes with a driven gear 29 on the forward end of a horizontal shaft 30 mounted in bearings in the frame uprights. The shaft 30 has fixed to it a gear 31 meshing with a gear 32 on a shaft 33 journalled in a bearing 34 sustained by the frame upright 1. The shaft 33 carries a disc 35 spaced from the gear 32, and between the gear and disc a revolving member in the form of a pin 36 is fixed so as to rotate with said parts. Extending parallel with the shaft 30 is a horizontal rock shaft 37 mounted in bearings in the frame, the forward end of which rock shaft is operatively connected with the operating gearing of a registering or measuring mechanism 37ª, in such manner that the rocking motions of the shaft will operate said gearing and actuate the measuring mechanism. The rocking motions are imparted to the shaft by the revolving pin 36 which in its rotation engages the end of an arm 39 fixed to and projecting inwardly from the rock shaft 37 in the path of the pin, and by such engagement rocks said arm arm periodically, corresponding to the successive cycles of operation of the pin, the arm 39 being held yieldingly in the path of the pin by means of a spring 40 (see Fig. 1) which is connected at its lower end to the frame upright 1 and at its upper end to a finger 41 on the forward end of the rock shaft.

The registering or measuring mechanism may be of the conventional standard form, and the form and relation of the operative connections between the feeler arm and measuring mechanism is such that for a given length of log or body, the displaced movement of the feeler arm, determined and controlled by the diameter of the body, will actuate the measuring mechanism to measure and indicate the solid contents or volume of the body in cubic yards, the successive movements of the feeler arm by the engagement therewith of the successive logs, and the successive vibrations of the arm 16 by the cam member 14, being accumulative in the rotation of the shaft 17 and in the gearing connecting said shaft with the measuring or registering mechanism.

In the particular construction shown to illustrate my invention, the radius of segment gear 11 is half that of segment gear 10, and consequently the angular movement of shaft 13 and consequently the cam 14 will be twice that of the feeler arm 6. The length of arm 16 and the rise of cam 14 for this angular movement is so proportioned that for a volume of one cubic yard, the shaft 17 is caused to make one revolution, which of course is accumulative of several motions of the feeler arm. Gears 27 and 29 are of the same diameter with respect to each other, and likewise gears 31 and 32 are of the same diameter with respect to each other, and consequently one revolution of shaft 17 will produce one cycle of the pin 36 and thereby operate the register to measure and record one cubic yard. These proportions are suitable for the measurement of bodies or logs of a given length.

Figure 4:
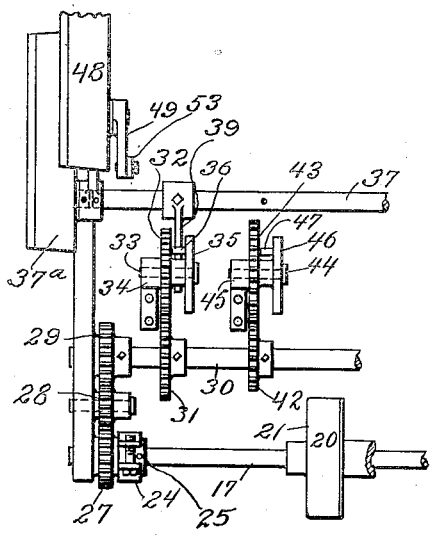
Fig. 4 is a fragmentary top plan view of the same.
Figure 5:
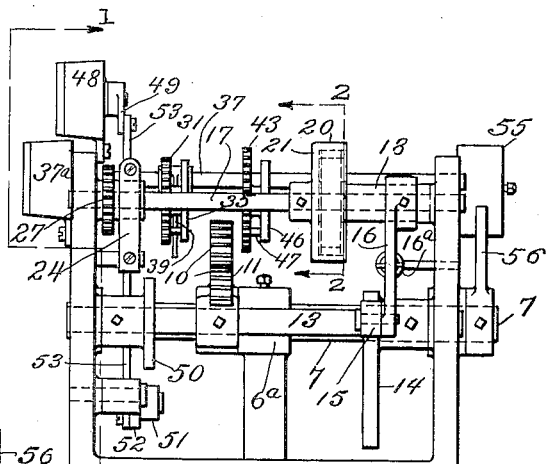
Fig. 5 is a horizontal sectional elevation on the line 5—5 of Fig. 1.
Figure 5:
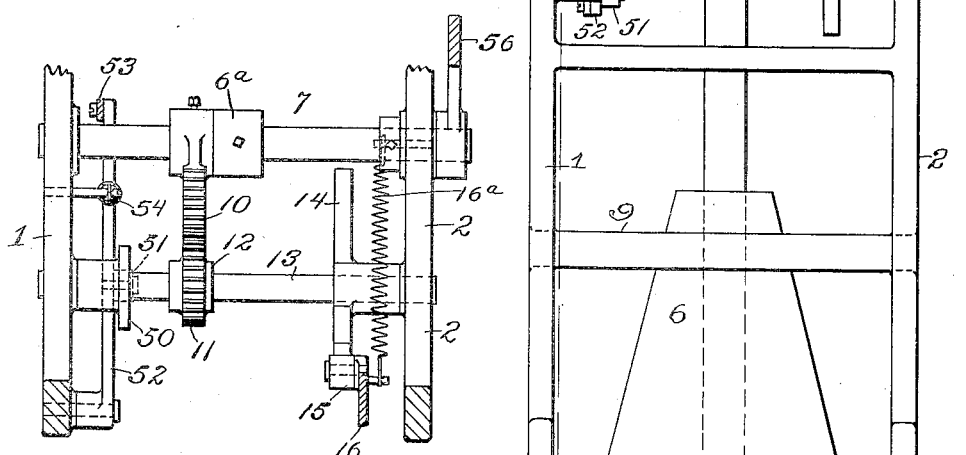

I propose however to provide for measuring logs of different length by arranging a second train of gearing operated by shaft 30 and adapted to operate rock shaft 37. This arrangement is shown in Fig. 4 where it will be seen that in rear of gear 31, shaft 30 has fixed to it a gear 32 of less diameter than gear 31, which meshes with a larger gear 43 on a short shaft 44 mounted in bearings 45 sustained by the frame. A disc 46 similar to the disc 35, is fixed to the shaft, and a revolving pin 47 similar to the pin 36, is fixed between the disc and gear to rotate therewith. To adapt the motion of this train of gearing to be transmitted to shaft 37 to rock the same, the arm 39 is made shiftable along the shaft to a position where it will extend in the path of the revolving pin 47. When this train of gearing is in action, by reason of the ratio of the gears 42 and 43, a greater number of movements of the rock shaft will be necessary to record a cubic yard than was necessary when the gears 31 and 32 were operative on the shaft, and consequently this second train of gearing is brought into action when logs of less length and those first handled are to be measured. By providing additional trains of gearing between the shafts 30 and 47, consisting of gears of different ratios, other lengths of logs or bodies may be measured as to their cubic contents or volume.

In order that the number of bodies or logs acting on the feeler arm may be counted, I provide a counting mechanism 48 sustained by the frame upright 1 above the measuring mechanism 37ª and operated by crank arm 49 operatively connected with the gearing of the counting mechanism in such manner that the oscillation of the crank arm will actuate said mechanism to indicate and record the number of oscillations. The crank arm 49 is oscillated in accordance with the swinging motions of the feeler arm, by means of a cam 50 fixed to the shaft 13 near its forward end in position to engage a roller 51 carried by a horizontal lever 52 journalled on a stud projecting inwardly from the frame upright 1. The opposite end of the lever has pivoted to it the lower end of a link 53 the upper end of which is pivoted to the free end of the crank arm. The lever 52 has connected with it one end of a spring 54 the other end of which is connected with the frame, which spring acts to pull up on the lever and maintain engagement of the roller thereon with the cam. As a result of this construction, the successive movements of the feeler arm produced by the engagement therewith of the successive logs or bodies, will correspondingly oscillate the crank arm 49 and thereby actuate the counting mechanism to indicate the number of the bodies.

It will be understood that in the operation of the apparatus by bodies of a given length, the selective device constituted by the arm 39 will be set in a position on the shaft 37 to cooperate with that particular train of gearing which will operate the arm, and consequently the mechanism 37ª, to record the cubic contents of bodies of that length passing through the machine. When however, bodies of another length are to be measured, the arm 39 will be shifted on the shaft 37 and set into operative relation to a different train of gearing, the ratio of whose gears are designed to bring about the operation of the mechanism to measure the cubic contents of bodies of that length.

It will be understood from the foregoing description of the construction and operation of my improved apparatus, that the contour of the cam 14 bears a mathematical relation to the angular displacements of the feeler arm, the said cam being so laid out mathematically in its relation to these angular displacements, that for a given length of body, the degree of displacement of the arm will, through the medium of the cam, actuate the registering mechanism to compute or measure the solid or cubic contents of the body.

Figure 3:
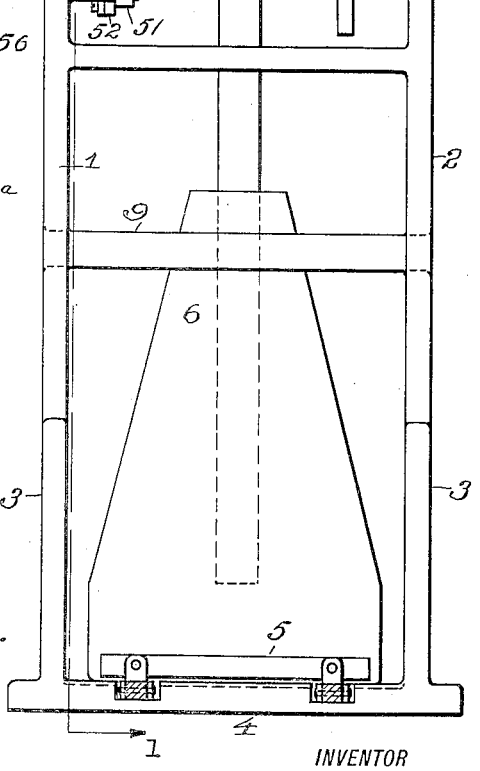
Fig. 3 is a front elevation of the mechanism.

The prompt return of the feeler arm to its normal position after being disengaged by the passing bodies is effected in the present instance by means of a weight 55 on an arm 56 fixed to the shaft 7 carrying the feeler arm, as shown in Figs. 1 and 3.

In the foregoing description and the accompanying drawings I have set forth my invention in the particular detailed form which I prefer to adopt, but it will be manifest that these details may be variously changed and modified by the skilled mechanic without departing from the limits of the invention; and it will be understood that the invention is not limited to any particular form or construction of the parts except in so far as limitations are specified in the claims.

Having thus described my invention what I claim is:

1. In a mechanism of the type described, the combination of a movable member adapted to be displaced by passing bodies to positions determined by the diameters of the respective bodies, a registering mechanism for registering the cubic contents of the bodies, and means operated by the displaced movements of the movable member and operatively connected with said registering mechanism to actuate the same, said means being so formed in relation to the registering mechanism, that for bodies of a given length, the displaced movements of the movable member will operate said mechanism to register the cubic contents of the bodies.

2. In a mechanism of the type described, the combination of a movable member adapted to be displaced by passing bodies to positions determined by the diameters of the bodies, a registering mechanism for indicating the cubic contents of the bodies, and means operated by the displaced movements of the movable member and operatively connected with said registering mechanism to actuate the same, said means being so formed that the displaced movements of the movable member will operate said mechanism to indicate the cubic contents of the bodies, and said means including a selective device to vary the operation of the registering mechanism according to the different lengths of the bodies.

3. In a mechanism of the type described, the combination of a movable feeler member adapted to be displaced by passing bodies to positions determined by the diameters of the bodies, a registering mechanism, a cam member operated by the feeler member, and operative connections between the cam member and registering mechanism, the contour of said cam member being such in relation to said operative connections and the registering mechanism, that for a given length of body, the displaced movements of the feeler member will operate the said mechanism to indicate the cubic contents of the bodies.

4. In a mechanism of the type described, the combination of a movable feeler member adapted to be displaced by passing bodies to positions determined by the diameters of the bodies, a registering mechanism for indicating the cubic contents of the bodies, a member operated by the feeler member different distances according to the displaced movements of the feeler member, a plurality of gear trains operated by said member, a second member operatively connected with the registering mechanism for actuating the same and adapted to be operated by the gear trains to indicate the cubic contents of the passing bodies according to the different lengths of the same, and selective means for operatively connecting either of said gear trains at will with said second member.

5. In a mechanism of the type described, the combination of a movable feeler member adapted to be displaced by passing bodies to positions determined by the diameters of the bodies, a registering mechanism to indicate the cubic contents of the bodies, a cam member operated by the feeler member, a member operated by the cam member different distances according to the displaced movements of the feeler member, a second member operatively connected with the registering mechanism, a plurality of gear trains operated by said first mentioned member for operating the registering mechanism according to the different lengths of the passing bodies, and selective means for operatively connecting either of said gear trains with said second member.

6. In a mechanism of the type described, the combination of a movable member adapted to be displaced by passing bodies to positions determined by the diameters of the bodies, a registering mechanism for indicating the cubic contents of the bodies, and means operated by the movable member and operatively connected with said mechanism to actuate the same, said means being so formed that the displaced movements of the movable member will operate the registering mechanism to register the cubic contents of the bodies, and said means including a plurality of gear trains and selective means for rendering either of said gear trains operative at will according to the lengths of the bodies whose cubic contents are to be registered.

7. In a mechanism of the type described, the combination of a movable feeler member adapted to be displaced by passing bodies to positions determined by the diameters of the bodies, a registering mechanism for registering the cubic contents of the bodies, a cam member operated by the feeler member, a rotary shaft, actuating mechanism operated by the cam member and acting on the rotary shaft to advance it step by step different distances according to the diameters of the successive bodies displacing the feeler member, and a gear train operated by said shaft and operatively connected with the registering mechanism, the contour of the cam member being such in relation to the shaft actuating mechanism and gear train, that for bodies of the given length, the displaced movements of the feeler member will operate the registering mechanism to register the cubic contents of the bodies.

8. In a mechanism of the type described, the combination of a feeler member adapted to be displaced by passing bodies to positions determined by the diameters of the bodies, a registering mechanism to register the cubic contents of the bodies, a rotary shaft, operative connections between the rotary shaft and registering mechanism for actuating it, a vibrating actuating arm clutched to said shaft and adapted when vibrated to advance the shaft step by step, and a cam member operated by the feeler member and engaging the vibrating arm to vibrate in, the contour of said cam member being in such relation to the actuating arm and shaft and operative connections, that for bodies of given length, the displaced movements of the feeler member will operate the registering mechanism to register the cubic contents of the bodies.

9. In a mechanism of the type described, the combination of a swinging feeler member adapted to be displaced by the passing bodies to positions determined by the diameters of the bodies, a registering mechanism to register the cubic contents of the bodies, a rotary shaft, a vibrating actuating arm clutched to the shaft and adapted when vibrated to advance the shaft step by step, operative connections between the shaft and the registering mechanism to operate the same, an oscillating cam member engaging the actuating arm to vibrate it, a segment gear connected with the cam member, and a segment gear connected with the feeler member and meshing with the first mentioned gear, the contour of the cam member being such in relation to the actuating arm and shaft and operative connections, that for bodies of a given length, the displaced movements of the feeler member will operate the registering mechanism to register the cubic contents of the bodies.

10. In a mechanism of the type described, the combination of a movable member adapted to be displaced by the passing bodies to positions determined by the diameters of the bodies, a registering mechanism to indicate the cubic contents of the bodies, a rocking member operatively connected with the registering mechanism to operate it, an arm on said rocking member, a rotary shaft adapted to be advanced step by step by the displaced movements of the movable member, a gear train operated by the rotary shaft, and a rotary member operated by the gear train and in position to engage the arm on the rocking member and rock said member.

11. In a mechanism of the type described, the combination of a movable member adapted to be displaced by the passing bodies to positions determined by the diameters of the bodies, a registering mechanism to indicate the cubic contents of the bodies, a rocking member operatively connected with the registering mechanism to operate it, an arm on said rocking member shiftable to different positions thereon in the direction of its axis, a rotary shaft adapted to be advanced step by step by the displaced movements of the movable member, a plurality of gear trains operated by the rotary shaft, and rotary members operated by the respective gear trains, in position to engage the arm in its different shifted positions.

12. In a mechanism of the type described, the combination of a member adapted to be displaced by passing bodies to positions determined by the diameters of the bodies, a measuring mechanism for indicating the cubic contents of the bodies, a rocking member operatively connected with the registering mechanism to operate it, an arm on said member movable with it and shiftable to different positions in the direction of the axis of the member, a plurality of rotary members in position to engage the arm in its different shifted positions respectively, and operative connections between the movable member and said rotary members, said operative connections being of such form and construction that the rotary members will be operated to actuate the registering mechanism to indicate the cubic contents of bodies in accordance with the different lengths of the same.

13. In a mechanism of the type described, the combination of a movable member adapted to be displaced by passing bodies to positions determined by the diameters of the bodies, a registering mechanism for indicating the cubic contents of the bodies, operative connections between the movable member and registering mechanism operated by the displaced movements of the movable member to actuate said registering mechanism, a counting mechanism to register the number of the bodies, and operative connections between the movable member and counting mechanism to actuate the latter, said connections being operated by the displaced movements of the movable member.

14. The combination of a movable member adapted to be displaced by passing bodies to positions determined by the diameters of the bodies, a registering mechanism, a cam member operated by the displaced movements of the movable member, an oscillating member actuated by the cam member, and operative connections between the oscillating mechanism and registering member to actuate the latter.

15. In a mechanism of the type described, the combination of a registering mechanism for registering the cubic contents of bodies, a movable member adapted to be displaced from normal position to different positions determined by the diameters of the bodies, and means between said movable member and registering mechanism for actuating the latter, said means being operated by the displaced movements of the movable member, and being so formed that for a given length of body, the registering mechanism will be so actuated as to register the cubic contents of the body.

16. In a mechanism of the type described, the combination of a registering mechanism for registering the cubic contents of bodies, a swinging member adapted to be displaced from normal position to different angular positions determined by the diameters of the respective bodies, and means between said swinging member and the registering mechanism for actuating the latter, said means being operated by the displaced movements of the swinging member and being so formed that for a given length of body, the registering mechanism will be so actuated as to register the cubic contents of the body.

17. In a mechanism of the type described, the combination of means for advancing logs endwise with a space between adjacent logs, a movable member adapted to be engaged by the successive logs and displaced from its normal position to different positions determined by the diameters of the respective logs, said member being adapted to return to normal position in the space in front of one log when disengaged from the log in advance, a registering mechanism for registering the cubic contents of the logs, and means between said movable member and the registering mechanism for actuating the latter, said means being operated by the displaced movements of the movable member and being so formed that for a given length of log, the registering mechanism will be actuated to register the cubic contents of the same.

18. In a mechanism of the type described, the combination of a registering mechanism to register the cubic contents of bodies, a swinging cam member adapted to be displaced to different angular positions by the bodies determined by the diameters of the latter, and means between the swinging cam member and the registering mechanism for actuating said mechanism, said means being operated by the displaced movements of the cam member, the contour of the cam member being such in relation to said means and said registering mechanism that for a given length of body, the displaced movement of the cam member will actuate the registering mechanism to register the cubic contents of the body.

In testimony whereof, I have affixed my signature hereto.

PAUL V. HOLLENBECK.